US00RE41221E

(19) United States
(12) Reissued Patent
Malik

(10) Patent Number: US RE41,221 E
(45) Date of Reissued Patent: Apr. 13, 2010

(54) SYSTEM AND METHOD FOR AUTOMATED PROVISION AND CUSTOMER SELECTION OF TEMPORARY ADVANCED INTELLIGENT NETWORK SERVICES

(76) Inventor: Dale W. Malik, 1035 Redfield La., Dunwoody, GA (US) 30338

(21) Appl. No.: 11/604,908

(22) Filed: Nov. 28, 2006

Related U.S. Patent Documents

Reissue of:
(64) Patent No.: 6,831,972
Issued: Dec. 14, 2004
Appl. No.: 09/609,611
Filed: Jul. 5, 2000

U.S. Applications:
(63) Continuation of application No. 09/908,068, filed on Aug. 11, 1997, now Pat. No. 6,187,787.

(51) Int. Cl.
*H04M 3/42* (2006.01)

(52) U.S. Cl. ..... 379/207.11; 379/230
(58) Field of Classification Search ..... 379/207.11, 379/201.01, 201.02, 201.12, 219, 220
See application file for complete search history.

(56) References Cited

U.S. PATENT DOCUMENTS 4,959,856 A * 9/1990 Bischoff et al. ..... 379/245
5,430,719 A 7/1995 Weisser, Jr.
5,544,236 A 8/1996 Andruska et al.
5,734,710 A 3/1998 Hirth et al.
5,745,553 A 4/1998 Mirville et al.
5,933,484 A 8/1999 Partridge, III
5,974,133 A * 10/1999 Fleischer et al. ..... 379/230
6,104,796 A 8/2000 Kasrai
6,438,601 B1 8/2002 Hardy

* cited by examiner

*Primary Examiner*—Creighton Smith
(74) *Attorney, Agent, or Firm*—Connolly Bove Lodge & Hutz LLP

(57) ABSTRACT

System and method for providing a customer with the ability to obtain temporary advanced telecommunication services in the Advanced Intelligent Network (AIN) for the customer's calling line by dialing a call to special access code, without the intervention of a service representative. The call is recognized as a request for an initiation of a temporary advanced telecommunication service with respect to the customer's calling line. On the basis of the recognition, an association may be retained between the calling line number and the service switching point serving the calling line number. This retained association may be used later in the activation of the temporary advanced telecommunication service for the calling line number. The call is routed to a rental service interface through which rental information from the caller may be collected. This rental information may be compiled into a rental agreement that is used as the basis for activation of the temporary advanced telecommunication services with respect to the caller's calling line number. Confirmation of the activation may be provided to the communication.

49 Claims, 4 Drawing Sheets

SYSTEM AND METHOD FOR AUTOMATED PROVISION AND CUSTOMER SELECTION OF TEMPORARY ADVANCED INTELLIGENT NETWORK SERVICES

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation of Ser. No. 09/908,068 filed Aug. 11, 1997, U.S. Utility Pat. No. 6,181,787, issued Jan. 30, 2001.

FIELD OF THE INVENTION

This invention generally relates to the field of telecommunications. This invention particularly relates to the field of activation of advanced services in an Advanced Intelligent Network (AIN). And even more particularly, this invention relates to the field of caller-activation of advanced services on a temporary basis in an AIN.

BACKGROUND OF THE INVENTION

In the competitive market of telecommunication services, a customer may desire to augment his or her conventional telecommunication service with advanced services. Generally, an advanced service is a service that provides features or functions that are not usually provided within a local switching system (e.g., #5ESS, manufactured by Lucent Technologies), that are relatively complex, that require coordination of multiple systems, and that are implemented typically through the use of data communications between or among network elements. Examples of advanced services audio caller ID, flexible call forwarding, etc.

Presently, to obtain advanced services, a customer typically must have a predefined relationship with a telecommunication service provider. A predefined relationship is required whether the telecommunication services are switch-based or whether the telecommunication services are provided by an AIN. In a switch-based system, the predefined relationship is a requirement because many services for a customer are implemented directly at the switch that serves the customer's calling line. More particularly, in the switch-based system, a block of information with respect to a customer's services is stored in the switch that serves the customer's calling line. This block of information is stored in the switch because of administration, control and billing reasons. Thus, for a customer to obtain a service, the customer has to contact the service provider to pre-register the service. The service provider then takes steps to specially and individually configure the block of information required to enable the customer's services in the switch that serves the customer's calling line. Thus, in a switch-based system, the predefined relationship between the customer and service provider provides that the switch serving the customer's calling line include a block of information relating to the services of the customer.

In the AIN, the predefined relationship between the customer and a service provider is also a requirement for advanced services, but for different reasons than in the switch-based system. In contrast to the switch-based system, in the AIN, information with respect to the advanced services of a customer is not stored directly at the switch that serves the customer's calling line. Rather, in the AIN, information with respect to a customer's advanced services is generally stored at an AIN element other than the service switching point (SSP) which serves as or in conjunction with a switch in the AIN. Usually, the AIN element that stores the information is a centralized AIN element such as a service control point (SCP) that may be accessed via data communications by multiple SSPs. Typically, such information is stored in a database or table associated with a service package application (SPA) that may be located at the SCP. An SCP may be queried via a data communication by an SSP for processing instructions with respect to the implementation of advanced services for a communication to or from a customer's calling line that is served by the SSP. Upon receipt of the query, the SCP consults the appropriate databases or tables and provides a response via another data communication to the SSP. This response includes processing instructions that are carried out by the SSP. In some cases, a service circuit node (SCN) may be consulted by the SCP or otherwise used in providing the advanced services.

Thus, in the AIN, the predefined relationship between the customer and the service provider provides that an SCP include an entry of information relating to an advanced service of the customer. Also in the AIN, the predefined relationship between the customer and the service provider provides for the appropriate mechanisms to reach the entry of information relating to the advanced service of the customer. These mechanisms operate such that an SSP that serves a customer's calling line having advanced services queries via data communication the appropriate SCP for call processing instructions. The SSP then carries out the instructions received in a response via data communication from the SCP.

FIG. 1 is a block diagram that is used to illustrate the steps that are presently taken in order to bring about the predefined relationship between a customer and a service provider in the AIN. As noted, the predefined relationship must exist in order to presently obtain advanced services in the AIN. Customer 1, who desires to obtain an advanced service, contacts the sales/service representative 2 of the customer's telecommunication service provider. The sales/service representative 2 engages the customer in a dialogue and obtains information from the customer with respect to the advanced service. The sales/service representative 2 then enters this information into a service order system 3. The service order system 3 uses the information to derive further information with respect to billing issues, to set up an entry of information with respect to the customer's advanced service, and to provide for the appropriate mechanisms to reach the entry of information.

From the service order system 3, the appropriate information or instructions based thereon are distributed as appropriate to the billing system 4, the service management system (SMS) 5, and the Mechanized Administration and Recent Change (MARCH). As the term implies, the billing system 4 uses the information or instructions to set up and carry out billing to the customer for the advanced service. The SMS 5 further distributes the information or instructions as appropriate to a service circuit node (SCN) 7 and/or a service control point (SCP) 8. The information is incorporated as an entry of information relating to the advanced service of the customer. Typically, this entry of information is stored in a database or table associated with an appropriate service package application (SPA). As noted above, this entry of information is part of the predefined relationship between the customer and the service provider. The MARCH 6 also further distributes the information or instructions, but the MARCH 6 distributes the information or instructions to an appropriate SSP 9 so that the appropriate mechanisms are set up at the SSP 9 to enable the SSP 9 to communicate with the SCP 8 and obtain instructions based on the entry of information. As also noted above, these appropriate mechanisms are part of the predefined relationship between the customer and the service provider.

The manner of establishing the requisite predefined relationship with a customer in the switch-based system or the AIN has posed problems to telecommunication service providers. One such problem is that a customer typically has been unable to obtain an advanced service without the execution of the lengthy and complex procedures described above that are necessary to set up the predefined relationship. These lengthy and complex procedures preclude a customer from directly setting up his or her own advanced services. These lengthy and complex procedures also preclude the short term implementation or "rental" of advanced services. In addition, these lengthy and complex procedures preclude the implementation of advanced services on short notice. In other words, it is generally impossible to be a "walk-up" customer of advanced services.

With respect to switch-based systems, a solution has been posed in the patent to Andruska et al., U.S. Pat. No. 5,544,236 to the problems of allowing a customer to directly set up his or her own switch services, of renting these services for a short term, and of implementing them on short notice. As noted above, in a switch-based system, a block of information with respect to a customer's advanced services is stored in the switch that serves the customers calling line. Andruska et al. provides a feature processor as part of the local switching system for use in connection with this block of information in the switch. In response to a call from a customer, the feature processor may be used to effectively change the block of information relating to the customer's service map that is stored in the switch.

Yet, Andruska et al. does not solve the problem of the lengthy and complex procedures for the set up of a predefined relationship in a switch-based system. Andruska et al. does not solve this problem because Andruska et al. does not address the problem of creating a predefined relationship. In Andruska et al., in order for a customer to access the feature processor to set up or change advanced services, the customer has to already have a predefined relationship and associated data block with the service provider. In other words, the block of information with respect to the customer must be present in order for Andruska et al. 's system to work to set or change the services available. Andruska et al. does not provide for the establishment of the predefined relationship, but rather, works on a predefined relationship that is in place.

Further, Andruska et al. does not present any solution for the AIN. As noted, Andruska et al. does not solve the problem of the lengthy and complex procedures the set up of an AIN service. In addition, Andruska et-al. does not present any solution for the AIN because Andruska et al. is directed to a switch-based system. Thus, the solution offered by Andruska et al. is inapplicable to the AIN. More particularly explained, as noted above, the differences between a switch-based system and the AIN result in differences in the type of predefined relationship that must be established with a customer in order to provide services. In the AIN, the predefined relationship requires an entry of information relating to the advanced service of the customer in a centralized AIN element such as an SCP that may be accessed via data communications by multiple SSPs. Andruska et al.'s posed solution works on the premise that the block of information relating to a customer's advanced services is stored in the switch serving the customer's calling line. Thus, Andruska et al. 's posed solution is inapplicable to the AIN.

In addition, in the AIN, the predefined relationship also requires that appropriate mechanisms be set up so that the entry of information relating to the advanced service of the customer that are stored in the centralized AIN element may be accessed from an SSP. As noted, Andruska et al. 's posed solution works on the premise that the block of information relating to a customer's services is stored in the switch serving the customer's calling line and merely toggles access to preexisting services. There is no need in Andruska et al.'s posed solution for a mechanism to reach an entry of information that is stored in a different element that must be accessed from the switch. Andruska et al. 's posed solution does not disclose such a mechanism, Thus, Andruska et al.'s posed solution is inapplicable to the AIN.

The problems faced in the AIN have not been solved with respect to the activities of customer selection and activation of advanced services, delivery of short term or rental of advanced services, and implementation of such advanced services on short notice. They have not been solved because the manner in which the predefined relationship must be established between a customer and a service provider precludes these activities. In particular, the manner in which an entry of information for a customer in a centralized AIN element is set up and the manner in which mechanisms are set up to access that entry of information have been stumbling blocks to the referenced activities.

As noted, the first of these stumbling blocks is the manner in which an entry of information is set up for a customer in a centralized AIN element. This task has been a stumbling block for several reasons. As explained above in connection with FIG. 1, in the AIN presently, the entry of information for a customer is accomplished by the following several steps. These steps include the receipt of the information by the sales/service representative 2 input of such information into the service order system 3, transmission of the information to the service management system (SMS) 5, and then finally further distribution of the information to a service circuit node 7 or service control point 8. Although this process is necessary, it is a process that requires human intervention through the use of the sales/service representative, takes a relatively long time, includes quite a few steps, and otherwise generally slows down the implementation of advanced services for a customer.

Although this process of providing an entry of information at the centralized AIN element is lengthy, the entry of information is limited to information relating to the particular advanced service to be provided to the customer. This entry of information does not correlate the customer and their directory number (calling line) to any particular service switching point (SSP) or other AIN element that serves the customer. Further, neither the SCP nor the SCN maintains any type of correlation table or database between customers' calling lines and the respective SSPs serving the calling lines. In other words, an SCP does not know which SSP serves which customer's calling line. When providing an SSP with processing instructions in response to a query, the SCP addresses the response based on information that is included in the query. The query/response exchange defines the relationship in communications between the SSP and the SCP. The SCP does not otherwise keep any correlative information between a customer's calling line and its serving SSP.

This lack of correlative information at the SCP is another problem in delivering customer selection and activation of advanced services, the rental of advanced services, and the implementation of advanced services on short notice. An entry of information may be provided at the SCP, but unless the SCP receives a query from the SSP serving the customer's line, it is unable to initiate a service without knowing which SSP to contact. Without this correlation, advanced services may not be applied to the customer's calling line because these advanced services are enabled through the SSP serving the customer's calling line. In other words, the SCP may have an entry of information for a customer that provides instructions for advanced services, but the SCP does not itself have any information with respect to a place to send the instructions relating to the enablement of the advanced services. This is a problem because the customer does not receive his or her desired advanced services.

Further, the lack of correlative information at a centralized AIN element such as an SCP or SCN between customers' calling lines and the respective SSPs that serve these calling lines is not a problem in a switched-based system. As explained above, in a switch-based system, a block of information with respect to a customer's services is stored in the switch that serves the customer's calling line. No other element generally is consulted with respect to the implementation of services for a customer's calling line other than the switch serving the calling line. Thus, there is no need for keeping track of which switch serves which calling lines in a switch-based system.

As referenced briefly above, there is at least another stumbling block to the provision of customer selection and activation of advanced services, delivery of short term or rental of advanced services, and implementation of such advanced services on short notice. This stumbling block is the manner in which mechanisms are set up to access the entry information relating to a customer that is stored in a centralized AIN element from an SSP. This task also has been a stumbling block for several reasons. As explained above in connection with FIG. 1, in the AIN presently, the appropriate mechanisms necessary to reach the entry of information at the SCN or the SCP are set up through parallel steps to the storage of the entry of information. The mechanisms are set up generally through a series of steps. These steps include the receipt of the information by the sales/service representative 2, input of such information into the service order system 3, transmission of the information to MARCH provisional system 5, and then finally further distribution of the information to an appropriate service switching point (SSP) 9.

This task of providing mechanisms is very important because without mechanisms at the appropriate SSP to provide access to the entry of information relating to the customer, there is no link then between the customer's calling line and the entry of information stored in the centralized AIN element. As noted above, neither the SCP nor the SCN maintains any type of correlation table or database between customer's calling lines and the respective SSPs serving the calling lines. Thus, these mechanisms are the only link between the SSP serving a customer's calling line and the instructions that are contained in the entry of information in the centralized AIN element that pertain to the implementation of advanced services with respect to a customer's calling line. Although the mechanisms are necessary, the manner in which these mechanisms are set up presently requires human intervention through the use of the sales/service representative, takes a relatively long time, includes quite a few steps, and otherwise generally slows down the implementation of advanced services for a customer.

Accordingly, there is a need for a method and system that provides for the provision of customer selection and activation of advanced services, delivery of short term or rental of advanced services, and implementation of such advanced services on short notice in an Advanced Intelligent Network (AIN).

There is also a need for a method and system that provides for the application of one or more advanced services in an AIN to a customer's directory number or calling line without the necessity of the customer having a predefined relationship with a telecommunication service provider with respect to the advanced services.

There is an additional need for a method and system that provides for the application of one or more advanced services in an AIN to a customer's directory number or calling line without the necessity of a service representative carrying out administrative tasks with respect to the customer.

There is yet another need for a method and system that allows an AIN element such as a service control point (SCP) keep track of a calling line number and the service switching point that serves the calling line number in a manner other than the query/response exchange relationship.

In addition, there is a need for a method and system that provides for the entry of information relating to a customer's advanced services in a centralized AIN element in a manner that avoids human intervention by a sales/service representative, that is accomplished quickly with few steps, and that minimally impedes the implementation of advanced services for a customer.

Also, there is a need for a method and system that provides for the set up of mechanisms at an SSP to access the entry information relating to a customer that is stored in a centralized AIN element that avoids human intervention by a sales/service representative, that is accomplished quickly with few steps, and that minimally impedes the implementation of advanced services for a customer.

SUMMARY OF THE INVENTION

The present invention is directed to a caller-activated rental system in the Advanced Intelligent Network (AIN) for temporary advanced telecommunication services and methods therefor. Through use of an exemplary embodiment, a customer who is interested in obtaining on short notice or renting temporary advanced telecommunication services may initiate the process for obtaining such advanced services by placing a call to a special access code. The call is routed to a rental service interface through which rental information from the caller may be collected. This rental information may be compiled into a rental agreement that is used as the basis for activation of the temporary advanced telecommunication services with respect to the caller's calling line number.

Advantageously, by this invention, a customer does not have to have a predefined relationship with a service provider in order to obtain such advanced services in the AIN but in most cases would. Also by this invention, the stumbling blocks to the short term and on short notice implementation of advanced services in the AIN have been overcome. This invention provides an effective manner for the entry of information for a customer in a centralized AIN element. This effective manner includes the creation of a rental agreement based on a customer's selections for advanced services and storage this rental agreement in a centralized AIN element. No prior entry of information relating to the customer need be stored in this element. Embodiments of this invention further provide an effective manner in which mechanisms are set up to access the rental agreement so as to apply the advanced services based on the customer's selections.

This effective manner includes retention of an association between the calling line number and the service switching point (SSP) serving the calling line at an early stage in the processing of the communication. This retained association may be used later to access the rental agreement in the activation of the advanced service for the calling line number. No longer does a customer have to rely on the sales/service representative of a telecommunication service provider to set up and activate an advanced service in the AIN. Rather, the customer may place a call whenever the customer desires to activate or rent a telecommunication service. Advantageously, the caller-activated rental system is easy to use, efficient, and makes good use of network resources.

Stated more particularly, the present invention includes methods such as the exemplary method of providing a caller-activated rental system for temporary advanced telecommunication services. Pursuant to this exemplary method, in response to receiving a communication directed to a special access code from a calling line number, a check may be conducted to determine whether a rental agreement is in place with respect to the calling line number of the communication. If there is no rental agreement in place, then an inquiry is made of the communication for rental information regarding advanced service for the calling line number. In response to the inquiry, rental information may be received and a rental agreement may be created. If there is a rental agreement in place, then an inquiry may be made of the communication for a change in rental information regarding the advanced service for the calling line number. In response to the inquiry, a change in the rental information or rental agreement may be received and such change entered. Based on the rental agreement, an activation or a change in the activation of the advanced service for the calling line number may be made. After making the activation or the change in the activation, confirmation thereof may be provided to the communication.

The present invention also includes systems such as the caller-activated rental system for temporary advanced telecommunication services in the AIN. Pursuant to this exemplary system, an advanced intelligent network (AIN) element such as a service control point (SCP) or other such element carries out several operations. This AIN element is operative to make a recognition of a communication as a request for an initiation of an advanced service with respect to a calling line number on the basis of use of a special access code to which the communication is directed. On the basis of the recognition, the AIN element may retain an association between the calling line number and a switch serving the calling line number. This retained association may be used later in the activation of the temporary advanced telecommunication service for the calling line number. In response to the recognition of the communication as a request for an initiation of an advanced service, the AIN element is operative to direct the collection of rental information regarding the advanced service for the calling line number. The AIN element is operative to receive the rental information, and may be operative to direct creation of a rental agreement regarding the advanced service for the calling line number. Preferably, the rental agreement is based on the rental information. On the basis of the rental information or the rental agreement, the AIN element is operative to direct activation of the advanced service for the calling line number. Finally, the AIN element is further operative to provide confirmation to the communication of the activation of the advanced service for the calling line number.

Another exemplary system of the present invention includes operations that are carried out by a first AIN element such as an SCP and a select AIN element such as a service circuit node (SCN). Pursuant to this exemplary system, the first AIN element is operative to make a recognition of a communication as a request for an initiation of an advanced service with respect to a calling line number on the basis of use of a special access code to which the communication is directed. The first AIN element is operative, on the basis of the recognition of the communication, to retain an association between the calling line number and a switch serving the calling line number. The first AIN element is further operative to use this association in the activation of the advanced service for the calling line number. The first AIN element also is operative to direct collection by a second AIN element from the communication of rental information regarding the advanced service for the calling line number.

In this exemplary system, the second AIN element is functionally connected to the first AIN element. The second AIN element is operative to make the collection from the communication of the rental information regarding the advanced service for the calling line number. The second AIN element may be further operative in response to collection of the rental information, to prepare a rental agreement regarding the advanced service for the calling line number. In addition, the second AIN element may be operative to provide the first AIN element with the rental agreement instead of the rental information. The second AIN element also is operative to provide the rental information to the first AIN element.

In this exemplary system, in response to receipt of the rental information, the first AIN element is further operative to make an activation of the advanced service for the calling line number. The first AIN element is further operative to provide confirmation to the second AIN element of the activation of the advanced service for the calling line number. The second AIN element then is further operative to receive the confirmation from the first AIN element of the activation of the advanced service for the calling line number and to provide the confirmation to the communication.

The present invention includes another system that includes AIN elements such as a service switching point (SSP), an SCP and an SCN. Pursuant to this exemplary system, the SSP is operative to receive a communication directed to a special access code from a calling line number. On the basis of the special access code, the SSP is operative to pause in the processing of the communication and to request instructions regarding the communication from the SCP. The SCP is functionally connected to the SSP, and is operative to retain an association between the calling line number of the communication and the SSP. The SCP also is operative to make a recognition that the communication is to be routed to a SCN. In response to the recognition, the SCP is operative to provide the instructions to the SSP to route the communication to the SCN. The switch then is operative, in response to receipt of the instructions, to route the communication to the SCN.

In this exemplary system, the SCN is functionally connected to the SSP and to the SCP. The SCN is operative, in response to receipt of the communication, to make a request for processing instructions from the SCP. The SCP is further operative, in response to the request, to provide the SCN with the processing instructions. The processing instructions include a direction to the SCN to make a collection from the communication of rental information regarding an advanced service for the calling line number. The SCN may be further operative, in response to the processing instructions, to make the collection from the communication of rental information. In response to the collection of the rental information, the SCN is operative to prepare a rental agreement regarding the advanced service for the calling line number. The SCN then may provide either the rental information or the rental agreement to the SCP. The SCP is further operative to receive the rental agreement or the rental information. On the basis of the rental agreement or the rental information, the SCP is operative to provide the SSP with activation instructions. The activation instructions include an order to the SSP to make an activation of the advanced service for the calling line number. The SSP then is operative, in response to the activation instructions, to make the activation of the advanced service for the calling line number. After activation, the SCP may be further operative to provide confirmation to the SCN of the activation of the advanced service for the calling line number. The SCN is further operative to receive the confirmation from the SCP of the activation of the advanced service for the calling line number and to provide the confirmation to the communication.

The present invention includes yet another system with respect to keeping track of a calling line number and its serving SSP. Pursuant to this exemplary system, an AIN such as an SCP is operative to receive information from a SSP. The information relates to a communication received at the SSP and the communication having a calling line number that is served by the SSP. On the basis of the information, the AIN element is operative to make a recognition of the communication as indicating a request for a service such as an advanced service. Alternatively, the AIN element may make the recognition of the communication as indicating the request for the service on the basis of use of a special access code in association with the communication. On the basis of the recognition, the AIN element is operative to retain an association between the calling line number and the SSP serving the calling line number. The AIN element is further operative to retain the association between the calling line number and the SSP serving the calling line number for a predetermined length of time. The AIN element is further operative, after expiration of the predetermined length of time, to erase the association between the calling line number and the SSP serving the calling line number. Through use of this exemplary system, the association between the calling line number and the SSP may be used in the provision of the service.

The present invention is disclosed in the context of exemplary embodiments that include caller-activated rental systems for temporary advanced telecommunication services and methods therefor. Those skilled in the art will appreciate that the principles of the present invention may be applied to virtually any type of telecommunication network which incorporates distributed call processing control.

Therefore, it is an object of the present invention to provide a caller-activated rental system for temporary advanced telecommunication services in an Advanced Intelligent Network (AIN) and methods therefor.

It is also an object of the present invention to provide a method and system that allows for the application of one or more advanced telecommunication services in an AIN to a customer's calling line number on short notice and for a short term rental.

It is an additional object of the present invention to provide a method and system for the application of one or more advanced services in an AIN to a customer's calling line without the necessity of the customer having a predefined relationship with a telecommunication service provider with respect to the advanced service.

It is further an object of the present invention to provide for a method and system that allows for the application of one or more advanced services in an AIN to a customer's calling line number through a call from a caller on the customer's calling line.

In addition, it is an object of the present invention to provide a method and system that allows for the application of one or more advanced services in an AIN to a customer's calling line without the necessity of a sales/service representative carrying administrative tasks with respect to such set-up for a customer.

Further, it is an object of the present invention to provide a method and system that allows an AIN element to keep track of a calling line number and its serving SSP by creating an association between a calling line number and the SSP when a communication is recognized as indicating a request for an advanced service.

In addition, it is an object of the present invention to provide a method and system that provides for the entry of information relating to a customer's advanced services in a centralized AIN element in a manner that avoids human intervention by a sales/service representative, that is accomplished quickly with few steps, and that minimally impedes the implementation of advanced services for a customer.

Also, it is an object of the present invention to provide a method and system that provides for the set up of mechanisms in an AIN to access the entry of information relating to a customer that is stored in a centralized AIN element and that avoids human intervention by a sales/service representative, that is accomplished quickly with few steps, and that minimally impedes the implementation of advanced services for a customer.

That the present invention and the exemplary embodiments thereof overcome the problems and drawbacks set forth above and accomplish the objects of the invention set forth herein will become apparent from the detailed description of exemplary embodiments which follows.

DETAILED DESCRIPTION

The present invention is directed to a caller-activated rental system in the Advanced Intelligent Network (AIN) for temporary advanced telecommunication services and methods therefor. The particular embodiments described herein are intended in all respects to be illustrative rather than restrictive. Alternative embodiments will become apparent to those skilled in the art to which the present invention pertains without departing from its spirit and scope.

Figure 1:
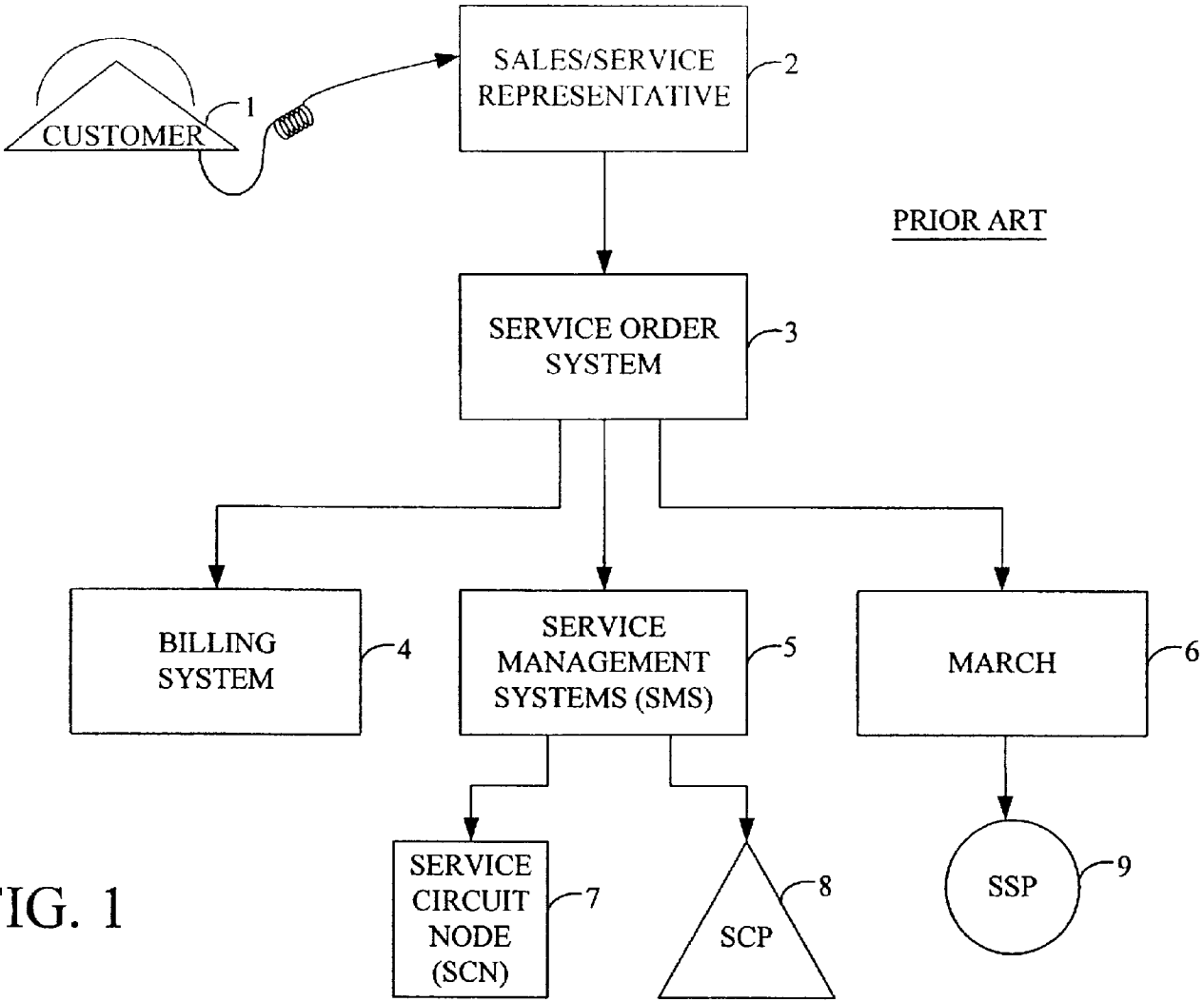
FIG. 1 is a block diagram illustrating the steps in bringing about a predefined relationship between a customer and a service provider in the AIN.
Figure 2:
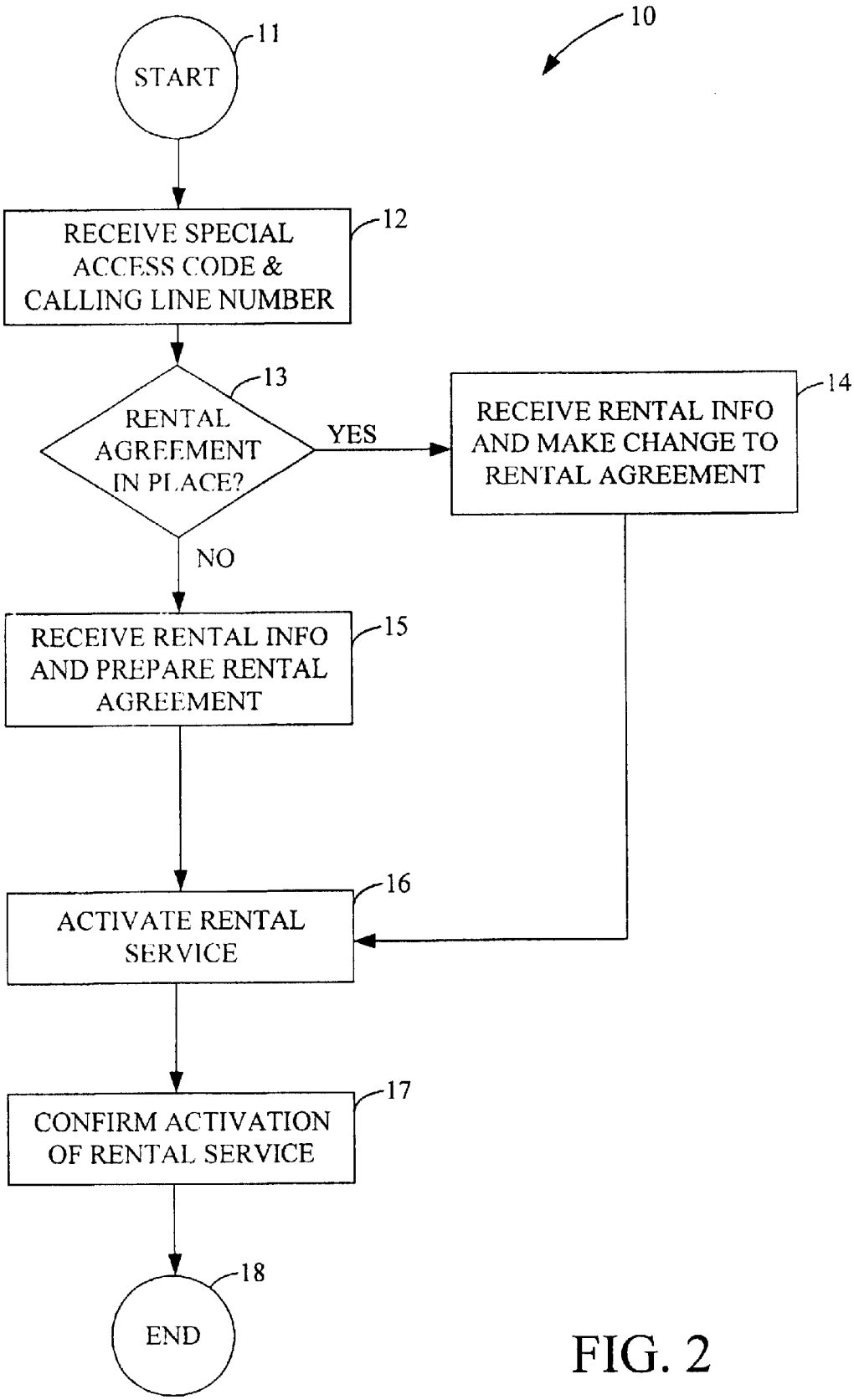
FIG. 2 is a flow diagram illustrating an exemplary method of operation of the present invention.

This detailed description first provides an overview of an exemplary embodiment of the present invention by reference to the flow diagram of FIG. 2. The overview is followed by a description of exemplary provisioning of the present invention in the exemplary environment. In other words, the exemplary provisioning description provides an explanation of the set-up of an exemplary embodiment through the preferred provisioning of a service switching point (SSP) with public office feature code (POFC) triggers and termination attempt (TAT) triggers. After this exemplary provisioning description, a description of an exemplary operation of an exemplary embodiment of the present invention in connection with the exemplary environment illustrated in FIG. 4. This description of exemplary operation includes examples illustrating a customer renting an advanced service, a customer initiating the termination of the rental of an advanced service, and termination of an advanced service based on expiration of a rental agreement. Throughout the drawings, like numerals indicate like elements.

Overview of an Exemplary Embodiment

Generally, the present invention provides a caller-activated rental system in an Advanced Intelligent Network (AIN) for temporary advanced telecommunication services and methods therefor. A "temporary advanced telecommunication service" is also referred to as an advance service herein.

FIG. 2 is a flow diagram illustrating an exemplary method 10 of operation of the present invention. After the start step 11, in step 12 a special access code and a calling line number are received in connection with a communication. Generally, the communication is directed to the special access code and is placed on a calling line associated with the calling line number. By direction of the communication to the special access code, the caller has provided an indication of a request for an advanced service. This advanced service may include a temporary advanced telecommunication service with respect to the calling line or calling line number associated with the communication. As used herein, the term "calling line" is used synonymously with the term "calling line number" unless a distinction is noted. For example, a customer, who is interested in receiving call forwarding service while he or she is on vacation, places a call to a special access code by using the telephone associated with the calling line number to which the call forwarding service is to be applied.

In step 13 of FIG. 2, a check is made to determine whether a rental agreement is in place with respect to the calling line number of the communication. For example, the customer may have already established a rental agreement for temporary advanced telecommunication services and may be calling to renew or revise the rental agreement. If the rental agreement is in place, then in step 14 the additional rental information or change in the rental information is received and an addition or change is made to the rental agreement. On the other hand, if the rental agreement is not in place, then in step 15 rental information is received and a rental agreement is prepared. For example, the customer may be a first time user of this caller-activated rental system for temporary advanced telecommunication services. After step 14 of making an addition or change to a rental agreement or after step 15 of preparing a rental agreement, in step 16 the rental service is activated based on the rental agreement. For example, a trigger may be provisioned in the customer's service switching point (SSP) such that calls to the customer's calling line number are forwarded while the customer is on vacation. In step 17, the activation of the rental service is confirmed. For example, the customer may receive an announcement that the call forwarding service has been set up so that the customer's calls are forwarded while the customer is on vacation. After this confirmation, the exemplary method ends in step 18.

Advantageously, the exemplary method allows a customer to rent selected advanced telecommunication services ("rental service") on short notice and for the short term. Further, the exemplary method allows the customer to activate the rental service with a minimum of time and effort and minimum interaction with a telecommunication service provider. Additional advantages of the present invention are discussed below.

Exemplary Operation of an Exemplary Embodiment in an Exemplary Environment

Overview of AIN elements

Figure 3:
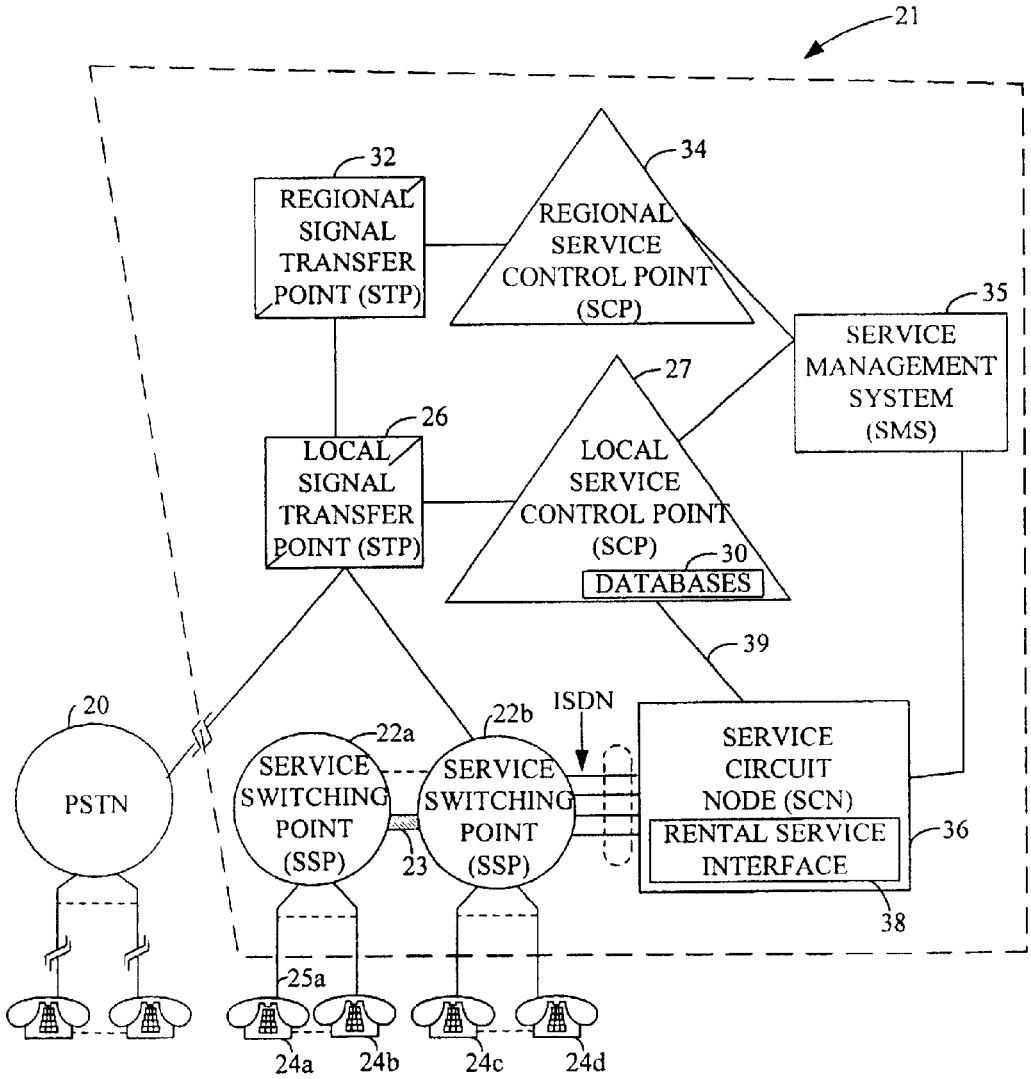
FIG. 3 is a diagram of an exemplary embodiment and exemplary environment for operation of the present invention.

FIG. 3 is a diagram of an exemplary embodiment and exemplary environment for operation of the present invention. Connected to the public switched telecommunication network (PSTN) 20 an exemplary environment is an Advanced Intelligent Network (AIN) 21. For brevity, only a basic explanation of the AIN 21 is provided herein. Where the AIN 21 operates or is composed differently in an important aspect from that which would be understood by those skilled in the art, additional details are provided herein. For further information regarding the referenced AIN 21 and aspects thereof, the interested reader is referred to the patent to Weisser, U.S. Pat. No. 5,430,719, which is incorporated herein by reference.

The AIN 21 includes a variety of interconnected network elements. A group of such network elements includes the plurality of central offices which are indicated as service switching points (SSPs) 22a, 22b in FIG. 2. An SSP typically includes switch functionality, but also includes other functionality so as to communicate with other AIN elements as those skilled in the art understand. As further illustrated in FIG. 3, the SSPs 22a, 22b have a plurality of subscriber lines connected thereto. A subscriber line may also be referred to as a calling line. Each SSP serves a designated group of calling lines, and thus, the SSP that serves a particular calling line may be referred to as its serving SSP. Each calling line is connected typically to a piece of terminating equipment including a plurality of telephones commonly referenced as 24 and individually referenced as 24a, 24b, 24c and 24d. Although telephones are illustrated as the pieces of terminating equipment in FIG. 3, those skilled in the art will understand that such pieces include other telecommunication devices such as facsimile machines, computers, modems, etc.

Pursuant to the preferred embodiment, each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number. Referring again to FIG. 3, SSPs 22a, 22b are interconnected by a plurality of trunk circuits 23. These are the voice path trunks that interconnect the SSPs to connect communications. The term "communication" or "call" is used herein to include all messages that may be exchanged between caller and called party in the network illustrated in FIG. 3.

Each of the SSPs 22a, 22b is connected to another type of AIN element referred to as a local signal transfer point (STP) 26 via respective data links. Currently, these are data links employing a signaling protocol referred to as Signaling System 7 (SS7) which is well known to those skilled in the art. Much of the intelligence of the AIN resides in yet another type of AIN element referred to as a local service control point (SCP) 27 that is connected to STP 26 over a SS7 data link. Among the functions performed by the SCP 27 is the maintenance of network databases and subscriber databases as represented collectively by databases 30. These databases may be used in providing temporary advanced telecommunication services to a customer. Typically, the SCP 27 is also the repository of service package applications (SPAs) that are used in connection with or as part of the databases 30 in the application of advanced telecommunication services or enhanced features to calling lines.

As used herein, the phrase "advanced telecommunication services" refers to features or enhancements that are provided by a telecommunication service provider to a customer in addition to conventional telephone service through the PSTN. Further, the phrase "temporary advanced telecommunication services" refers to telecommunication services that may be "rented" to a customer for a limited time such as in connection with the present invention. In contrast, a telecommunication service to which a customer subscribes in a conventional manner (rather than "rents") is typically subscribed to on an open ended basis so long as the customer pays for the service. Examples of temporary advanced telecommunication services include flexible call forwarding service, network voice mail service, and calling name delivery.

Referring again to FIG. 3, the local STP 26 may be connected to other network elements through a regional STP 32, which in turn, may be connected to a regional SCP 34. Both regional SCP 34 and local SCP 27 are connected via respective data links to a service management system (SMS) 35. The SMS 35 interfaces to business offices of the local exchange carrier and interexchange carriers.

In order to keep the processing of data and calls as simple as possible, a relatively small set of triggers is defined at the SSPs for each call. A trigger in the AIN is an event associated with a particular calling line that generates a packet to be sent to an SCP. The trigger causes the SCP to query its databases or service package applications for processing instructions with respect to the particular call. The results are sent back to the SSP in a response from the SCP 27 through STP 26. The return packet includes instructions to the SSP as to how to process the call. The instructions may be to take some special action as a result of a customized calling service or enhanced feature. In response, the SSP moves through its call states, collects the called digits, and generates further packets that are used to set up and route the call. Similar devices for routing calls among various local exchange carriers are provided by regional STP 32 and regional SCP 34.

As illustrated in FIG. 3, the AIN 21 also includes a service circuit node 36 (SCN), which may also be referred to herein as a service node (SN). SCN 36 includes voice and dual tone multi-frequency (DTMF) signal recognition devices and voice synthesis devices. In addition, SCN 36 may include a rental service interface 38 for use in connection with the present invention as is explained further below. SCN 36 is connected to the local SCP 27 via data link 39 using an X.25 protocol and to the SMS 35 via a data link. In addition, SCN 36 typically is connected to one or more (but usually only a few) SSPs via Integrated Service Digital Network (ISDN) links as shown by the connection to SSP 22b.

Exemplary Provisioning of the Present Invention in the Exemplary Environment

As explained above, a customer initiates a request for a temporary advanced telecommunication service by placing a call from a device associated with the calling line number to which the service is to be applied. In addition, the customer places the call to a special access code to indicate the request for the advanced service. To accommodate these requests for advanced services, an exemplary embodiment of the present invention provides for the recognition of two types of triggers at each of the service switching points (SSPs) that are used in connection with the exemplary embodiment. With respect to the first type of trigger, each of the calling lines that may be used to request advanced services at a particular SSP are provisioned with a special access code trigger which may also be referred to as a feature access code trigger. Preferably, this trigger is a public office feature code trigger (POFC) that responds to a feature access code comprising an asterisk followed by two digits, to-wit: *XX. Thus, a customer dials the feature access code (*XX) which triggers the SSP based on the recognition of the feature access code as a POFC trigger to initiate a query/response exchange with the SCP. Additional details regarding this POFC trigger are provided below in connection with FIG. 4.

With respect to the second type of trigger, each of the calling lines that may be used to request advanced services at a particular SSP are provisioned with a termination attempt trigger (TAT) in an idle state. As is explained in further detail below in connection with FIG. 4, when an advanced service is to be applied to a calling line, then the SCP provides the appropriate SSP with an instruction to change the state of the TAT trigger for that calling line from the idle state to an active state. The effect of a TAT trigger on a calling line in the active state will be understood to those skilled in the art as causing a pause at the SSP serving the calling line in the processing of any communication received on or directed to the calling line number. The SSP pauses so as to query the SCP and receive a response with instructions as to further processing of the communication. In this manner, the SSP obtains the instructions for applying the advanced service to the communication. When the advanced service is to be removed from the calling line, then the SCP provides the appropriate SSP with an instruction to change the state of the TAT trigger for that calling line from the active state to the idle state. In the idle state, the TAT trigger does not cause a pause in the processing of a communication received on or directed to the calling line number.

The clever reader may question why the TAT trigger for each of the calling lines that may be used to request advanced services at a particular SSP are provisioned with a TAT trigger in the idle state rather than in the active state. The clever reader understands that the pause in the processing of a communication on or directed to a calling line number having an active TAT trigger is minimal and hardly noticed by the caller. With every TAT trigger active, then every communication that is received on or directed to a calling line number that may be used to request advanced services could be checked for the application of advanced services. Admittedly, this approach may be taken with respect to the implementation of the present invention. But advantageously, this exemplary embodiment of the present invention avoids such costly use of AIN resources. This exemplary embodiment provides for a change in the state of the TAT trigger from idle to active when advanced services are to be applied to a particular calling line number. In this manner, only the communications to which advanced services are to be applied are paused in their processing. The other communications are not delayed, overhead is not wasted in fruitless query/response exchanges, and useless steps are not undertaken.

Exemplary Operation

Rental of an Advanced Service

Figure 4:
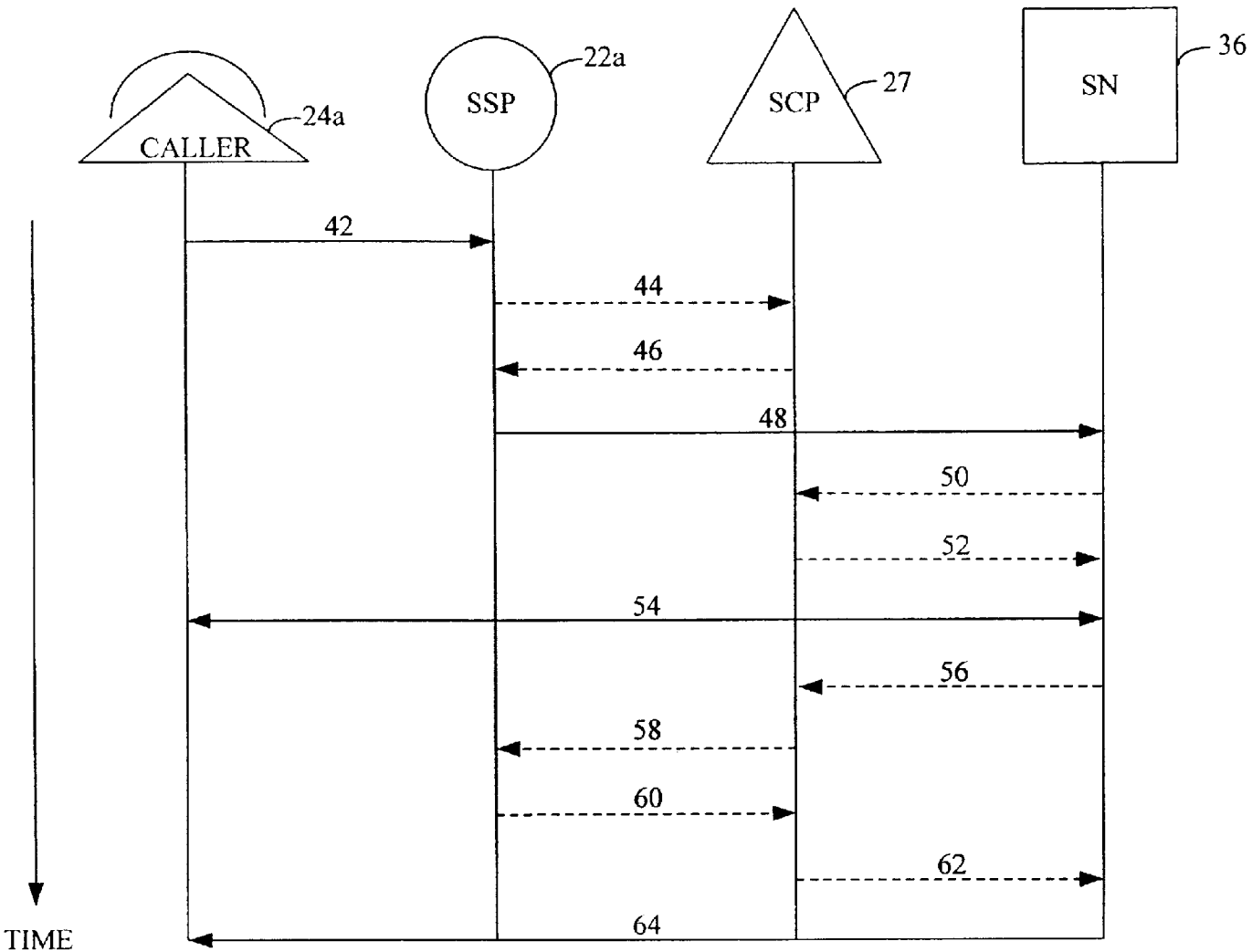
FIG. 4 is a timing/block diagram illustrating an exemplary method of operation of the present invention.

FIG. 4 is a timing/block diagram illustrating an exemplary method and system of operation of the present invention. This exemplary method and system are described in the context of a customer making use of the rental system to obtain a temporary advanced telecommunication service. Assume the customer ("Dale") is using his telephone 24a which is connected by calling line 25a to SSP 22a. In other words, SSP 22a serves Dale's calling line 25a. As explained in the exemplary provisioning description above, SSP 22a is provisioned such that it initiates a query/response exchange with SCP 27 on receipt on a special access code based on a public office feature code (POFC) trigger. In addition, Dale's calling line 25a is provisioned with a termination attempt trigger (TAT) in the idle state.

Also assume that Dale is interested in obtaining advanced call forwarding service with respect to the calling line number associated with his telephone 24a and calling line 25a, but only for the time that Dale is on vacation. As a result of the temporary nature in application of the advanced call forwarding service to Dale's calling line, Dale may be considered to be "renting" the service. As a first step in renting the service, Dale places a call from his telephone 24a and calling line 25a by using a feature access code such as *XX. Where "XX" may be any set of numbers that may be dialed from a telecommunication device. As noted, an exemplary embodiment provides for the use of *XX based on the provisioning of the appropriate SSPs with a POFC trigger.

Referring to FIG. 4, as indicated by arrow 42, the feature access code is received with the communication in the SSP 22a serving Dale's calling line 25, and is recognized by the SSP 22a as an indicator of the special status of the communication. The solid line in arrow 42 and other arrows indicates that the communication is carried over voice links rather than data links. The special access code triggers the SSP 22a to pause in the processing of the call and to obtain further instructions from other network elements. Referring to the example, Dale's call to the feature access code is received in SSP 22a, which pauses in the processing of the communication to request instructions from SCP 27. As indicated by arrow 44, this request preferably takes the form of a query from SSP 22a to SCP 27. The dashed line in arrow 44 and other arrows indicates that the medium is a data link rather than a voice link and that the information exchange is a data exchange.

As part of the SSP's query to the SCP 27 for processing instructions, the SSP 22a provides the SCP 27 with information relating to the communication. This information may be provided in a TCAP message pursuant to the SS7 protocol. In particular, the SSP 22a provides the SCP 27 with communication information including the feature access code and the calling line number. In addition, the SSP 22a provides the SCP 27 with identification information. This identification information includes an originating point code (OPC) or other identifier as appropriate.

In response to receiving the communication information and the identification information from the SSP 22a, the SCP 27 carries out certain functions. The SCP 27 look up the meaning of the feature access code, and this may be accomplished by looking up the code through use of a service package application (SPA). Upon look up, the SCP 27 determines that the communication is an indication that the customer desires to access the rental system with respect to the rental or other implementation of an advanced service. Based on this determination, the SCP further determines that the communication is to be routed to the service circuit node (SCN) 36. Thus, as indicated by arrow 46, the SCP 27 provides a response with instructions to the SSP 22a to route the communication to the SCN 36.

As noted, the SCP 27 recognizes the feature access code as indicative that the communication is a request for a special service. On the basis of this recognition, the SCP 27 retains an association between the calling line or calling line number of the communication and the SSP 22a which originated the query to the SCP 27. The SCP 27 may retain this association in database 30 or some other appropriate storage medium. Preferably, the SCP retains the originating point code (OPC) associated with this communication in a database 30. This may be a database that is shared by service package applications (SPAs) that are associated with SCP 27. The retention of this OPC may be accomplished through the use of an SPA that is referred to herein as "SPA #1". Advantageously, the present invention preferably provides that the SCP 27 retain the association between the calling line number and the SSP 22a at this point in the processing of the communication. Retaining this association at this point in the call processing is advantageous because the SCP 27 otherwise does not have any information with respect to the relationship between an SSP and the calling lines or calling line numbers that the SSP serves. As is explained below, later in the processing of the caller's rental agreement, the SCP 27 may have to take steps to change the status in the TAT trigger for Dale's calling line 25a from idle to active so as to apply advanced call forwarding services to the calling line 25a. So, it is an advantage that the SCP 27 have a method or system for keeping track of the association between a calling line number and its serving SSP. This exemplary embodiment may further provide that the SCP 27 retain the association between the calling line number and its serving SSP for a predetermined length of time. After expiration of the predetermined length of time, this association may be erased.

Referring once more to FIG. 4, as indicated by arrow 48, upon receipt of the processing instructions from the SCP 27, the SSP 22a routes the communication over voice links in a conventional manner to the SCN 36. Upon receipt of the communication from the SSP 22a, the SCN 36 recognizes on the basis of the special access code that the communication is a request for special service such as access to the rental system for rental of advanced services. The SCN 36 may make this recognition by checking an appropriate table or database or through the use of a service package application (SPA) that is referred to herein as "SPA #2". Thus, as indicated by arrow 50, the SCN 36 pauses in the processing of the communication to query the SCP 27. The SCN 36 provides the SCP 27 with communication information including the special access code. In addition, this query may include a request to the SCP 27 to check whether a rental agreement is in place with respect to this customer, calling line or calling line number. Additional details regarding a rental agreement are discussed below. The SCP 27, in response to the query, makes a recognition of the communication as a request for a special service such as a request for rental of an advanced service. This recognition may be accomplished through the use of other tables or databases as those skilled in the art will understand. This recognition also may be accomplished through the use of an SPA that is referred to herein as "SPA #3". As part of this recognition, the SCP 27 may use SPA #3 to check whether a rental agreement is in place with respect to this customer, calling line or calling line number.

Referring still to FIG. 4, as indicated by arrow 52, on the basis of the recognition of the communication as a request for a special service, the SCP 27 provides the SCN 36, and preferably SPA #2, with processing instructions. These instructions include a direction to the SCN 36 to make an inquiry for or a collection from the communication of rental information regarding temporary advanced telecommunication services for the calling line number. In other words, the SCP 27 instructs the SCN 36 to obtain information from the caller about the temporary advanced telecommunication services the caller may be interested in renting and the terms therefor. These instructions may include a report to the SCN 36 that a rental agreement is already in place with respect to this customer, calling line or calling line number. In that case, the SCP 27 recognizes the communication as a request for a change to the rental agreement. Thus, the SCP 27 instructs the SCN 36 to obtain information from the caller about the changes to the temporary advanced telecommunication services the caller may be interested in and the terms therefor.

Referring again to FIG. 4, as indicated by arrow 54, in response to the instructions from the SCP 27 to collect the rental information or changes thereto, the SCN 36 proceeds with making an inquiry of the communication for rental information or changes thereto regarding the temporary advanced telecommunication service for the calling line number. The double head on arrow 54 indicates that an information exchange takes place between the caller 24a and the SCN 36. Referring to the example, the SCN 36 may use the rental service interface 38 (also referred to as SPA #2) to ask questions of Dale and/or to provide Dale with information such as service options. The rental service interface 38 may provide an audio interaction, dual tone multi-frequency (DTMF) interaction, a data interaction or a video interaction with the caller. The rental service interface 38 may make the inquiry and take the responses in a menu-type format. The rental service interface 38 also may be used to collect and compile the rental information or changes thereto that are collected from the caller. The rental information or changes thereto that are collected may vary depending on the temporary advanced telecommunication service that is desired to be rented by the caller. For example, the rental information collected for advanced call forwarding service may differ from the rental information collected for advanced three-way calling service based on the different nature of these services. By way of analogy, the rental service interface 38 (and the SCN 36) may be thought of as rental agent in this rental transaction with the customer, Dale, being interested in short term rental of advanced call forwarding services.

To further the analogy, the collected and compiled information may be referred to as a rental agreement because the information generally includes the terms regarding application of the temporary advanced telecommunication services to the calling line number. Further, the rental agreement may provide that the rental information be compiled pursuant to a selected format or protocol. Thus, the rental agreement may include information as to the type of temporary advanced telecommunication services that are to be provided, the time limits for application of the services to the calling line number, etc. and this information may be formatted into a selected protocol or arrangement. For example, Dale may provide information that is collected as rental information and that is incorporated into the rental agreement. This rental agreement may specify that Dale desires advanced call forwarding service to be applied to his calling line number while he is on vacation.

Referring to FIG. 4, as indicated by arrow 56, after collection, the rental information and/or the rental agreement (or changes thereto) are provided by the SCN 36 to the SCP 27, and preferably to SPA #3. As appropriate, the rental service interface 38 may be used to convert the rental information and/or the rental agreement (or changes thereto) from the format that is used to interact with the caller to the format that is most appropriate for transmission to and use by the SCP 27 such as the X.25 protocol.

Upon receipt of the rental information and/or the rental agreement (or changes thereto) from the SCN 36, the SCP 27 may make a determination as to whether the telecommunication service requested or change requested by the caller is available. This determination may be made on the basis of the information in the rental information and/or the rental agreement. In addition, this determination may be made through the use of SPA #3 or the databases 30 that are maintained by the SCP 27. The SCP 27 is particularly well situated to make this type of determination because the SCP 27 typically includes service package applications (SPAs) that are used by a telecommunications network to implement services or enhanced features. For example, the SCP 27 may check the appropriate SPA and the resources of the network to determine whether advanced call forwarding services may be applied to Dale's calling line number while he is on vacation. This determination step is an advantage of the present invention because it provides dynamic evaluation of the available resources of the service provider and the network and provides the caller with a response based on this evaluation. In other words, if the resource are unavailable with respect to a caller's request, the caller is not left in limbo. Rather, the caller may be informed of this unavailability. On the other hand, if the resources are available, then the caller may be provided with assurances that the temporary advanced telecommunication service is available.

Even though our example included only a request for a single temporary advanced telecommunication service, it should be understood that a caller may request that multiple temporary advanced telecommunication services be applied to his or her calling line number. In that case, the rental information and/or rental agreement includes information with respect to these multiple services. The SCP 27 checks with the appropriate SPAs and network resources as to whether any or all of the requested services may be applied to the caller's calling line number. Advantageously, the caller does not have to use a piecemeal approach with respect to the rental of services. Preferably, information from the call is collected and consolidated through use of the rental service interface 38 in the SCN 36 in rental information or a rental agreement. This collected information in the form of the rental information or the rental agreement is used in a unified fashion. Thus, the present invention provides a "gateway" for the caller to a whole host of telecommunication services..

After the SCP 27 makes a determination that the temporary advanced telecommunication service requested by the caller as indicated in the rental information and/or rental agreement is available, then on the basis of the rental information or the rental agreement, the SCP 27 and preferably SPA #3 takes steps to make an activation of the service for the calling line number. In other words, the SCP 27 takes steps to apply the service. As noted in the background prior to this invention, there was no correlative information stored in the SCP 27 so as to keep track of which SSPs serve which calling lines. Prior to this invention, it would have been impossible for the SCP 27 to take steps to provide instructions with respect to the activation of an advanced service with respect to a particular calling line because the SCP 27 would not have had information as to where to provide the instructions.

Advantageously, an exemplary embodiment of the present invention provides a mechanism whereby the SCP 27 may provide activation instructions to the appropriate SSP. As explained above, when an SSP 22a initially receives a communication directed to the special access code, the SSP 22a pauses in the processing of the communication and initiates a query/response exchange with the SCP 27. As part of the query, the SSP 22a provides the SCP 27 with identification information. The SCP 27 retains an association between the calling line or calling line number of the communication and the SSP 22a which originated the query to the SCP 27. Preferably, the SCP retains the originating point code (OPC) associated with this communication in a database 30 that may be accessed by the SPAs of the SCP 27. Thus, at this point in the processing of the rental agreement for the customer, the SCP 27 may access this identification information, and in particular, may access the OPC to determine where to send the activation instructions. Referring to FIG. 4, as indicated by arrow 58, the SCP 27 provides activation instructions to SSP 22a as the SSP that serves the calling line number associated with the communication. In this exemplary embodiment, these activation instructions include a directive to SSP 22a to change the status of the termination attempt trigger (TAT) on the calling line associated with the communication from the idle state to the active state. The effect of the TAT trigger on the calling line in the active state causes a pause at the SSP 22a serving the calling line in the processing of any communication received on or directed to the calling line number. The SSP 22a pauses so as to query the SCP 27 and receive a response with instructions as to further processing of the communication. In this manner, the SSP 22a obtains the instructions for applying the advanced service to the communication. As indicated by arrow 60, the SSP 22a preferably provides confirmation of the activation of the TAT (or other activation) to the SCP 27. Although the term "activation" implies immediacy, those skilled in the art will understand that the activation instructions (including the change in status of the TAT from idle to active) may provide that such activation take place at a later time.

Preferably, the SCP 26 and in particular SPA #3 retains the rental information or rental agreement for a predetermined length of time. By retaining the rental information or rental agreement, the SCP 26 has this material available in case another call for temporary telecommunication service is placed by the caller during the predetermined length of time. For example, Dale may decide to extend his vacation. Assuming that Dale is vacation at or near his calling line, Dale may use his calling line to place a call to the feature access code and to interact with the rental system so as to extend the provision of temporary advanced call forwarding services to his calling line. As noted above, an exemplary embodiment of the present invention checks whether a rental agreement (or other rental information) is in place prior to collecting new or additional rental information. Preferably, the SCP 27 checks whether a rental agreement (or rental information) is in place before the SCP 27 provides the SCN 36 with collection instructions. If the SCP 27 finds that a rental agreement (or rental information) is in place, then the SCP 27 may provide the SCN 42 with collection instructions that specify that the SCN 36 collect the rental information based on an inquiry for a change in the rental information. After the SCN 36 collects the change in the rental information, the SCN 36 may prepare a change in the rental agreement regarding the temporary advanced telecommunication services for the calling line number. As before, the SCN 36 provides the rental information and/or rental agreement, but with the change in the rental information and/or the rental agreement, to the SCP 27. The SCP 27 then takes steps to bring about the change in the temporary advanced telecommunication service by providing change activation instructions to the switch serving the calling line number.

Advantageously, in an exemplary embodiment, the caller is provided with confirmation as to the activation of the service or to the change in the service. In particular, as indicated by arrow 62 in FIG. 4, the SCP 27 provides confirmation to the SCN 36 of the activation or of the change activation of the temporary telecommunication service for the calling line number. With this confirmation step, the caller may rest assured that the temporary advanced telecommunication service or the change to the service is applied to his or her calling line number. For example, after the advanced call forwarding service is activated with respect to Dale's calling line number, the SCP 27 provides a confirmation to the SCN 36 that such activation has taken place. The SCN 36, preferably through use of the rental service interface 38, may provide Dale with an announcement that confirms that activation had take place pursuant to the terms of the rental agreement. This confirmation from the SCN 36 to the caller is illustrated as arrow 64 in FIG. 4.

After this rental of the advanced service, calls that are directed to Dale's calling line number are forwarded pursuant to his directions. For example, a communication that arrives at the SSP 22a that serves Dale's calling line number will be paused in its further processing based on the active state of the TAT trigger on Dale's calling line. The SSP 22a checks with the SCP 27 as to further processing of the communication. The SCP 27 accesses the rental agreement in its database or service package application with respect to this calling line number and provides the SSP 22a with instructions based on that rental agreement. The SSP 22a then carries out the instructions with respect to the communication.

Customer Initiated Termination of the Rental of an Advanced Service

The preceding section described an exemplary method and system of the present invention in the context of a customer making use of the rental system to obtain a temporary advanced telecommunication service. Generally, the same exemplary method and system may be used by a customer to terminate the rental of a temporary advanced telecommunication service, but with certain modifications in the steps and system. For example, assume Dale returns early from vacation and desires to terminate the rental of the advanced call forwarding service that was applied to his calling line number.

Referring to FIG. 4 again, as indicated by arrow 42, Dale places a call from his calling line 25a and directs the call to the feature access code. The SSP 22a triggers on the feature access code, pauses in the processing of the communication, and initiates a query/response exchange (arrows 44, 46) with the SCP 27. The SCP 27 retains the identification information relating to the communication (including preferably the OPC) and provides the SSP 22a with instructions in a response to route the communication to the SCN 36. As indicated by arrow 48, the SSP 22a routes the communication to the SCN 36. The SCN 36 reads the calling line ID associated with the communication and initiates an information exchange (arrows 50, 52) with the SCP 27. The SCP 27 checks with the appropriate database of SPA and finds that a rental agreement is in place with respect to this calling line number. The SCP provides the SCN 36 with information to that effect. The SCN 36 then engages in an information exchange (arrow 54) with Dale and obtains information that Dale desires to terminate the rental of the advanced service. As indicated by arrow 56, the SCN 36 provides this information as to the termination of the advanced service to the SCP 27. The SCP 27 then initiates an exchange with the appropriate SSP 22a (arrows 58, 60) based on the identification information that the SCP 27 had retained when it was initially queried by the SSP 22a about the communication. In the exchange, the SCP 27 provides the SSP 22a with instructions to change the status of the TAT trigger from active to idle. After the SCP 27 receives confirmation from the SSP 22a as to this change, then the SCP 27, in turn, provides confirmation to the SCN 36 as indicated by arrow 62. The SCN 36 then may provide confirmation to Dale that the advanced service that had been applied to his calling line 25a has been terminated. Henceforth, communications directed to Dale's calling line number are not forwarded.

Termination of an Advanced Service Based on Expiration of a Rental Agreement

In the previous section, an exemplary method and system is described with respect to customer termination of the rental of an advanced service. But an advanced service may be terminated based upon the expiration of a predetermined amount of time as specified by the customer or for other reasons. As explained above, the SCP 26 and in particular SPA #3 retains the rental information or rental agreement with respect to the customer. This rental information or rental agreement may include information with respect to the length of time that advanced services are to be applied to the customer's calling line. The SPA #3 may retain a flag with respect to this rental agreement that a time has been set for termination of the advanced service. Thus, when a communication directed to the customer's calling line number is received and a query is made to the SCP 27 for processing instructions, the SCP 27 and in particular SPA #3 checks this flag to determine whether the set time has expired. If the set time has not expired, then the SCP 27 provides the SSP 22a with instructions with respect to the application of the advanced services. If the set time has expired, then the SCP 27 provides the SSP 22a with instructions to route the communication without application of advanced services. In addition, the SCP 27 and in particular SPA #3 sends an instruction to the SSP 22a to change the status in the TAT trigger associated with the calling line number from active to idle. Further, the SCP 27 and in particular SPA #3 removes or otherwise deletes the rental agreement so that it is no longer retained with respect to the relevant calling line number. With the change in status of the TAT trigger on the customer's calling line and with the deletion of the rental agreement, the customer's calling line is no longer accorded advanced services. Advantageously, the change in the status of the TAT trigger assures that wasteful query/response exchanges do not take place with respect to the customer's calling line number, and deletion of the rental agreement frees up space in the database to service other temporary service requests.

The above-described examples illustrate that the present invention provides a caller-activated rental system for temporary advanced telecommunication services and methods therefor. By this invention, a customer does not have to rely on the service representative of a telecommunication service provider to set up and activate an advanced service. Rather, the customer may place a call whenever the customer desires to activate or rent an advanced service.

From the foregoing description of the exemplary embodiments of the present invention and operation thereof, other embodiments will suggest themselves to those skilled in the art. Therefore, the scope of the present invention is to be limited only by the claims below and equivalents thereof.

I claim:

1. A method to induce provision of a telecommunications service for a calling line, comprising:

receiving a communication directed to a special access code (SAC), the communication providing information regarding the telecommunications service for the calling line; and providing the telecommunications service for the calling line pursuant to the information.

2. The method of claim 1, further comprising:

receiving a follow-up communication directed to the SAC, the follow-up communication providing additional information regarding the telecommunications service for the calling line; and changing the provision of the telecommunications service for the calling line pursuant to the additional information.

3. The method of claim 1, wherein the communication originates from a calling line served by a service switching point (SSP), the calling line being assigned a calling line number; and further comprising:

retaining an association between the calling line number or the calling line and the SSP.

4. The method of claim 3, wherein providing the telecommunications service comprises use of the association.

5. The method of claim 4, wherein providing the telecommunications service comprises providing the telecommunications service for the calling line in the SSP based on the association.

6. The method of claim 5, wherein providing the telecommunications service comprises activating a trigger on the calling line in the SSP.

7. A method to keep track of a calling line and a service switching point (SSP) serving the calling line, comprising:

receiving information from the SSP with respect to a communication originating from a calling line served by the SSP, the calling line being assigned a calling line number;

storing an association between the calling line number or the calling line and the SSP, wherein the communication originating from the calling line served by the SSP comprises a communication dialed to a special access code (SAC);

wherein the information received from the SSP comprises the SAC; and wherein the association between the calling line number or the calling line and the SSP is stored based on the SAC being included in the information received from the SSP.

8. The method of claim 7, wherein storing the association comprises storing the association for a predetermined length of time.

9. The method of claim 7, wherein the information comprises a query from the SSP, the query including the calling line number and originating point code (OPC) for the SSP; and wherein storing the association comprises storing the association between the calling line number or the calling line and the OPC of the SSP.

10. A method to provide a telecommunications service to a line number, comprising:

receiving information from a service switching point (SSP) regarding a communication originating from a line served by the SSP, the line being assigned the line number;

storing an association between the line number to the line and the SSP; and using the associations to provide the SSP with [the] activation instructions relating to the telecommunications service for the line number;

wherein the communication originating from the line served by the SSP comprises a communication dialed to a special access code (SAC);

wherein the information received from the SSP comprises the SAC; and wherein the association between the line number of the line and the SSP is stored based on the SAC being included in the information received from the SSP.

11. The method of claim 10, wherein the information comprises a query from the SSP, the query including the calling line number and originating point code (OPC) for the SSP; and wherein storing the association comprises storing the association between the calling line number or the calling line and the OPC of the SSP.

12. The method of claim 10, wherein storing the association comprises storing the association between the line number or the line and an originating point code (OPC) of the SSP.

13. The method of claim 10, wherein using the association to provide the SSP with the activation instructions comprises directing the SSP to activate a terminating attempt trigger (TAT) on the line.

14. The method of claim 13, further comprising:

receiving a query from the SSP as a result of a call to the line number having encountered the TAT; and providing a response to the SSP to provide the telecommunications service for the line number.

*15. A method to keep track of a calling line and a switching node of a communication network serving the calling line, comprising:*

*receiving information from the switching node with respect to a communication originating from a calling line served by the switching node, the calling line being assigned a calling line number;*

*storing an association between the calling line number or the calling line and the switching node,*

*wherein the communication originating from the calling line served by the switching node comprises a communication dialed to a special access code (SAC);*

*wherein the information received from the switching node comprises the SAC;*

*and wherein the association between the calling line number or the calling line and the switching node is stored based on the SAC being included in the information received from the switching node.*

*16. The method of claim 15, wherein storing the association comprises storing the association for a predetermined length of time.*

*17. The method of claim 15, wherein the information comprises a query from the switching node, the query including the calling line number and originating point code for the switching node, and wherein storing the association comprises storing the association between the calling line number or the calling line and the originating point code of the switching node.*

*18. A method to provide a telecommunications service to a line number, comprising: receiving information from a switching node of a communication network regarding a communication originating from a line served by the switching node, the line being assigned the line number; storing an association between the line number to the line and the switching node; and using the associations to provide the switching node with activation instructions relating to the telecommunications service for the line number, wherein the communication originating from the line served by the switching node comprises a communication dialed to a special access code (SAC); wherein the information received from the switching node comprises the SAC; and wherein the association between the line number of the line and the switching node is stored based on the SAC being included in the information received from the switching node.*

*19. The method of claim 18, wherein the information comprises a query from the switching node, the query including the calling line number and originating point code for the switching node, and wherein storing the association comprises storing the association between the calling line number or the calling line and the originating point code of the switching node.*

*20. The method of claim 18, wherein storing the association comprises storing the association between the line number or the line and an originating point code of the switching node.*

*21. The method of claim 18, wherein using the association to provide the switching node with the activation instructions comprises directing the switching node to activate a terminating attempt trigger on the line.*

*22. The method of claim 21, further comprising:*

*receiving a query from the switching node as a result of a call to the line number having encountered the terminating attempt trigger; and*

*providing a response to the switching node to provide the telecommunications service for the line number.*

*23. A caller-activated rental system for temporary advanced telecommunication services, comprising:*

*a communication network element operative;*

*to make a recognition of a communication as a request for an initiation of a temporary advanced telecommunication service with respect to a calling line on the basis of use of a special access code to which the communication is directed;*

*to direct the collection of rental information regarding the temporary advanced telecommunication service for the calling line;*

*to receive the rental information; and*

*on the basis of the rental information, to direct activation of the temporary advanced telecommunication service for the calling line number.*

*24. The system of claim 23, wherein the communication network element is further operative to direct creation of a rental agreement regarding the temporary advanced telecommunication service for the calling line number with the rental agreement being based on the rental information, and wherein the communication network element is further operative to receive the rental agreement instead of the rental information, and on the basis of the rental agreement, instead of the rental information, to direct the activation of the temporary advanced telecommunication service for the calling line.*

*25. The system of claim 23, wherein the communication network element is further operative to provide confirmation to the communication of the activation of the temporary advanced telecommunication service for the calling line.*

*26. The system of claim 23, wherein the communication network element is further operative, on the basis of the recognition of the communication, to retain an association between the calling line and a switching node serving the calling line number.*

*27. The system of claim 26, wherein the association between the calling line number and the switching node serving the calling line is used in the activation of the temporary advanced telecommunication service for the calling line.*

*28. The system of claim 23, wherein the rental information comprises a termination time for the temporary advanced*

*telecommunication service for the calling line, wherein the communication network element is operative to direct the collection of the termination time, to receive the termination time, and on the basis of the termination time, to direct deactivation of the temporary advanced telecommunication service for the calling line.*

*29. In a telecommunications network having a rental system of temporary advanced telecommunication services wherein an activation of a temporary advanced telecommunication service has been made based on a rental agreement relating to the calling line, a method to deactivate the temporary advanced telecommunication service with respect to the calling line, the method comprising:*

*receiving a communication directed to the calling line;*

*in response to receiving the communication directed to the calling line, making a check of the rental agreement relating to the calling line, the rental agreement including a termination time for the temporary advanced telecommunication service for the calling line;*

*determining the termination time has expired; and*

*in response to said determining, processing the communication without application of the temporary advanced telecommunication service to the calling line.*

*30. The method of claim 29, wherein said processing further comprises deleting the rental agreement relating to the calling line.*

*31. The method of claim 29, wherein the activation of the temporary advanced telecommunication service comprises setting a trigger to cause the check of the rental agreement in response to receipt of the communication directed to the calling line; and*

*wherein said processing further comprises releasing the trigger so as to avoid another check of the rental agreement in response to receipt of another communication directed to the calling line.*

*32. In a communication network, a system to keep track of a calling line and a switching node servicing the calling line, comprising:*

*a network element configured to:*

*receive information from a switching node, the information relating to a communication received at the switching node, and the communication being on a calling line that is served by the switching node;*

*recognize the communication as indicating a request for a service, based on the information; and*

*retain an association between the calling line and the switching node, based on said recognizing, wherein the association is used to provide the service.*

*33. The system of claim 32, wherein the network element is further configured to:*

*recognize the communication as making a request for the service on the basis of use of a special access code in association with the communication.*

*34. The system of claim 32, wherein the network element is further configured to:*

*retain the association between the calling line and the switching node serving the calling line for a predetermined period of time; and*

*erase the association between the calling line and the switching node serving the calling line after expiration of the predetermined period of time.*

*35. In a telecommunications network having a rental system of temporary advanced telecommunication services wherein an activation of a temporary advanced telecommunication service has been made based on a rental agreement relating to the calling line, a system to deactivate the temporary advanced telecommunication service with respect to the calling line, the system comprising:*

*a network element operative;*

*to recognize a communication directed to the calling line as necessitating a check of the rental agreement relating to the calling line, the rental agreement including a termination time for the temporary advanced telecommunication service for the calling line;*

*to cause the check of the rental agreement including a determination as to whether the termination time has expired; and*

*if the termination time has expired, to direct processing of the communication without application of the temporary advanced telecommunication service to the calling line.*

*36. The system of claim 35, wherein the network element is further operative to cause deletion of the rental agreement relating to the calling line.*

*37. The system of claim 35, wherein the activation of the temporary advanced telecommunication service comprises setting a trigger to cause the check of the rental agreement relating to the calling line; and*

*wherein the network element is further operative to cause a release of the trigger so as to avoid another check of the rental agreement in response to receipt of another communication directed to the calling line.*

*38. A computer-readable medium containing machine-executable instructions that, when executed by a processor, cause the processor to implement a method to induce provision of a telecommunications service for a calling line, the method comprising:*

*receiving a communication directed to a special access code (SAC), the communication including information regarding the telecommunications service for the calling line; and*

*providing the telecommunications service for the calling line pursuant to the information.*

*39. The medium of claim 38, wherein the machine-executable instructions, when executed by the processor, further cause the method implemented by the processor to comprise:*

*receiving a follow-up communication directed to the special access code, the follow-up communication providing additional information regarding the telecommunications service for the calling line; and*

*changing the provision of the telecommunications service for the calling line pursuant to the additional information.*

*40. The medium of claim 38, wherein the communication originates from a calling line served by a switching node, the calling line being assigned a calling line number, wherein the machine-executable instructions, when executed by the processor, further cause the method implemented by the processor to comprise:*

*retaining an association between the calling line number or the calling line and the switching node.*

*41. The medium of claim 40, wherein providing the telecommunications service comprises using the association.*

*42. A computer-readable medium containing machine-executable instructions that, when executed by a processor, cause the processor to implement a method to keep track of a calling line and a switching node of a communication network serving the calling line, the method comprising:*

*receiving information from the switching node with respect to a communication originating from a calling*

*line served by the switching node, the calling line being assigned a calling line number;*

*storing an association between the calling line number or the calling line and the switching node,*

*wherein the communication originating from the calling line served by the switching node comprises a communication dialed to a special access code (SAC);*

*wherein the information received from the switching node comprises the SAC; and*

*wherein the association between the calling line number or the calling line and the switching node is stored based on the SAC being included in the information received from the switching node.*

*43. The medium of claim 42, wherein storing the association comprises storing the association for a predetermined length of time.*

*44. The medium of claim 42, wherein the information comprises a query from the switching node, the query including the calling line number and originating point code for the switching node; and*

*wherein storing the association comprises storing the association between the calling line or calling line number and the originating point code of the switching node.*

*45. A computer-readable medium containing machine-executable instructions that, when executed by a processor, cause the processor to implement a method to provide a telecommunications service to a line number, comprising:*

*receiving information from a switching node of a communication network regarding a communication originating from a line served by the switching node, the line being assigned the line number;*

*storing an association between the line number to the line and the switching node; and using the associations to provide the switching node with the activation instructions relating to the telecommunications service for the line number,*

*wherein the communication originating from the line served by the switching node comprises a communication dialed to a special access code (SAC);*

*wherein the information received from the switching node comprises the SAC; and*

*wherein the association between the line number of the line and the switching node is stored based on the SAC being included in the information received from the switching node.*

*46. The medium of claim 45, wherein the information comprises a query from the switching node, the query including the calling line number and originating point code for the switching node; and*

*wherein storing the association comprises storing the association between the calling line number or the calling line and the originating point code of the switching node.*

*47. The medium of claim 45, wherein storing the association comprises storing the association between the calling line number or the calling line and the originating point code of the switching node.*

*48. The medium of claim 45, wherein using the association to provide the switching point with the activation instructions comprises directing the switching node to activate a trigger on the line.*

*49. The medium of claim 48, wherein the machine-executable instructions, when executed by the processor, further cause the method implemented by the processor to comprise:*

*receiving a query from the switching node as a result of a call to the line number having encountered the trigger; and*

*providing a response to the switching node to provide the telecommunications service for the line number.*

* * * * *